Feb. 24, 1970  R. R. WOLFNER ET AL  3,496,652
BOTTLE TOY
Filed May 13, 1968
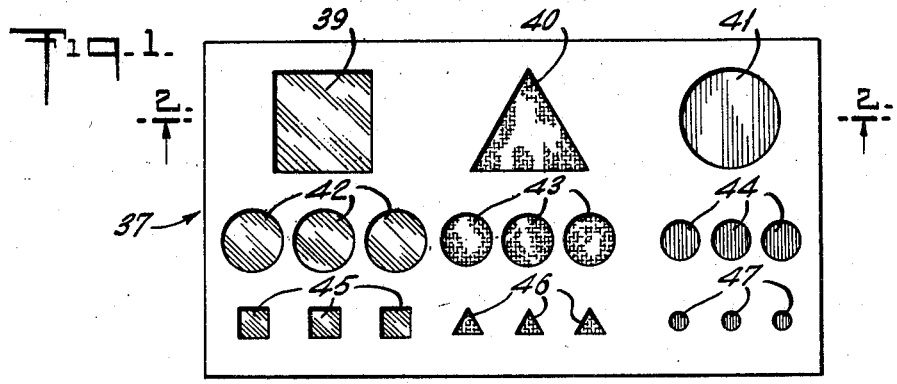
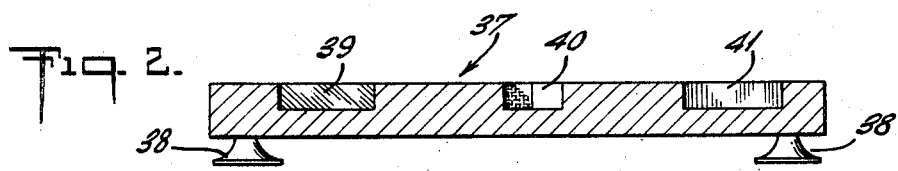
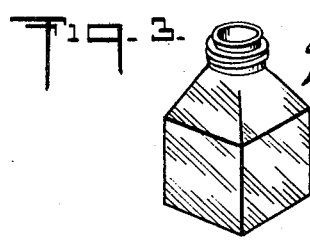
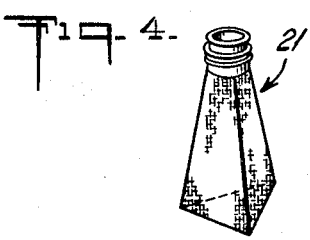
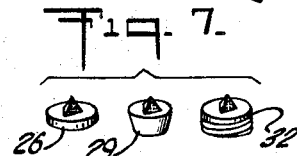
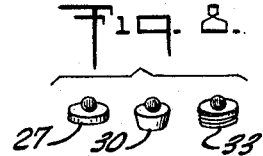
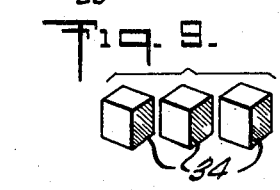
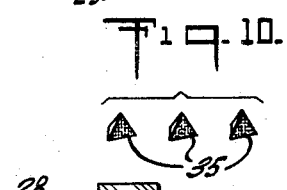
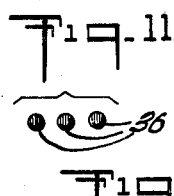
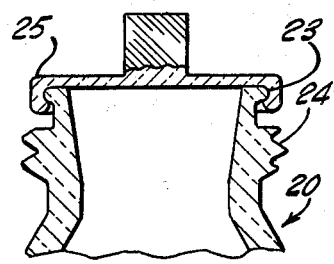
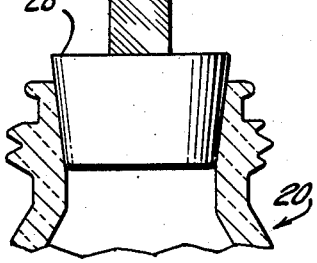
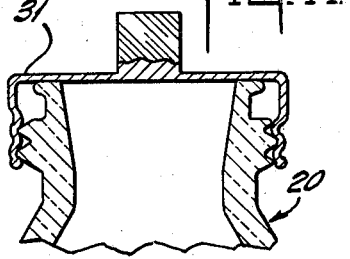
INVENTORS
RHODA RUTH WOLFNER
MYRTLE S. CONTE
BY
ATTORNEYS

United States Patent Office 3,496,652
Patented Feb. 24, 1970

3,496,652
BOTTLE TOY
Rhoda Ruth Wolfner, Bayside, N.Y. (278 Gramercy Drive, Jericho, N.Y. 11753), and Myrtle S. Conte, 643 Harold St., Mamaroneck, N.Y. 10543
Filed May 13, 1968, Ser. No. 728,671
Int. Cl. G09b 19/00; A63f 9/08
U.S. Cl. 35—22                            6 Claims

ABSTRACT OF THE DISCLOSURE

A child's instructional toy set comprised of three bottles, with three tops and three insert objects for each bottle, together with a storage board for these articles, the bottles, tops, and insert objects being so shaped and colored as to indicate to the child which top and insert objects match which bottles.

BACKGROUND OF THE INVENTION

The invention set forth herein relates to both the toy art, in that it is a toy with which a small child may amuse himself, and the teaching aid art, in that the child may be prompted by observation of the relationship between parts of the toy, aided perhaps by the comments of a parent or teacher, to learn to recognize similarities of shape or color between otherwise disparate objects.

Small children have difficulty in assimilating abstract ideas or concepts such as "greenness" or "squareness" if they are presented on a purely verbal level. They are best able to learn to recognize similarities in color or shape or function if allowed to manipulate numerous objects having such similarities. Under these conditions they often observe and deduce the underlying similarities between objects by a trial-and-error process and will then be receptive to the efforts of a teacher who names the characteristics which the child has already perceived. This learning process may be speeded if the toy or teaching aid involved has physical characteristics which naturally lead the child to segregate its parts in accordance with color or shape.

Toys which lead a child to observe characteristics of shape or color are known, as, for example, jig-saw puzzles or peg boards where the child matches round pegs with round holes. It is sometimes difficult or impossible to persuade a very young child to use such toys, however, since his limited intelligence, short attention span, and lack of verbal skill (combined perhaps with impatience or lack of understanding in his parent or teacher) makes it impossible to get the point of the game across. Confronted with a jig-saw puzzle in dozens of pieces, the child cannot be brought to understand that they will combine into a unitary picture. Whatever skill in pattern or color recognition he might gain if he attemped properly to assemble the puzzle does not result because he makes no such attempt.

With some toys, such as the peg board example given, there is only one type of clue to the proper assembly of the parts (shape in the case of the peg board).

If the child fails to note that the parts are related by shape, he is not likely to learn this while properly assembling them on the basis of some other clue, since no other clue exists.

SUMMARY OF THE INVENTION

The invention is a toy which is comprised of a number of bottles of different colors. Each bottle has a number of closures, as for example a press-on lid, a plug, and a screw-on lid. The closures are the same color as the bottle to which they are adapted, and will not fit the other bottles in the set. The bottles are of different basic shapes, one being substantially cubical, one of pyramid shape, and the other substantially spherical. For each bottle, number of identical insertable objects are provided, each related to its bottle by a similar color and shape, and each sized so that it can be inserted in the bottle to which it is related.

The whole set of bottles, closures and insertable objects may be stored in a board having recesses for these components, each recess being suitably shaped and colored to indicate which component it will hold.

The toy as described has a number of advantages. First, observation shows that small children have a natural desire to play with bottles, inserting objects in them, putting closures on them, and so forth. Thus, the components of the toy are vary attractive in themselves, without regard to the assembly of them in any special way. The child is led to play with them extensively before any idea of their relationship through color and shape forms in his mind. Unlike, say, the component parts of a jig-saw puzzle, the components of the invention are intrinsically interesting to the child and useful as playthings before he perceives that they can be assembled in an orderly manner.

A second advantage is that the child may assemble the components in a meaningful way by using either of two clues, color or shape. Having done so, the relationship based on the other clue may become apparent. Thus, for example, if he assemblies all the red objects he may notice that they are related by their "squareness" or "cubicalness" (assuming that the cubical bottle is colored red), thus becoming aware of relationships based on shape.

Finally, the use of bottles with various size necks and various types of closures affords practice to the child in the skills required to selected and apply closures to bottles. These are homely skills which, like buttoning clothes, tying shoelaces, and opening doors, must be mastered by young children.

BRIEF DESCRIPTION OF THE DRAWINGS

FIG. 1 is a plan view of a storage board;
FIG. 2 is a section view on plane 2—2 of FIG. 1;
FIGS. 3, 4 and 5 are perspective views of three bottles;
FIG. 6 is a perspective view of closures for the bottle of FIG. 3;
FIG. 7 is a perspective view of closures for the bottle of FIG. 4;
FIG. 8 is a perspective view of closures for the bottle of FIG. 5;
FIG. 9 is a perspective view of three insert objects for the bottle of FIG. 3;
FIG. 10 is a perspective view of three insert objects for the bottle of FIG. 4;
FIG. 11 is a perspective view of three insert objects for the bottle of FIG. 5; and
FIGS. 12, 13 and 14 are enlarged partial sections of the mouth of the bottle of FIG. 3, showing various closures in place therein.

DESCRIPTION OF THE PREFERRED EMBODIMENT

The invention is a multiple-part toy. As shown, there are three bottles, which may be of polyethylene, polyvinyl chloride, or other unbreakable material. They are a green cubical bottle 20, a yellow pyramidal bottle 21 in the shape of a triangular pyramid, and a red spherical bottle 22.

The necks of the bottles are as shown in FIGS. 12–14, each comprising a slight lip 23 at the outer edge of the mouth and a threaded segment 24 having a root diameter greater than that of lip 23. The necks of the bottles differ in size, cubical bottle 20 having the largest, and spherical bottle 22 the smallest neck.

Three closures are provided for each bottle: a snap-on lid, a stopper, and a screw-on cap. Each matches its bottle in color. The snap-on lids 25, 26, and 27 are respectively sized to fit the necks of bottles 20, 21 and 22. They snap over the lips 23 on these bottles and may be made of polyethylene. The stoppers 28, 29, and 30 are respectively sized to fit into the necks of bottles 20, 21, and 22. They may be of polyethylene, rubber, wood, or any other suitable material. Screw-on caps 31, 32, and 33 are respectively adapted to mate with threads 24 on bottles 20, 21, and 22. These caps may be of polyethylene, other plastic, or metal. Each closure has a knob on its top in the shape of the bottle it fits, i.e., a cube, a pyramid, or a sphere.

Each bottle is also accompanied by a number of insertable objects which may be placed on the bottle by a child. These are of the same color as the bottle with which they are associated and may be of polyethylene, wood, or other suitable material. In addition, their shape corresponds to that of the bottle with which they are associated. Cubes 34 are associated with cubical bottle 20, pyramids 35 with pyramidal bottle 21, and spheres 36 with spherical bottle 22. The insertable objects are sized so that cubes 34 can enter the large throat of cubical bottle 20, but not the other bottles, while pyramids 35 can enter the throat of pyramidal bottle 21 but not spherical bottle 22.

For storage purposes, and to allow the child to arrange the components in an orderly fashion, a storage board 37 is provided, having recesses or sockets to receive the components of the toy described above. The storage board is supported by a suction cup 38 at each corner, to fasten it securely to a table top or other flat surface.

The recesses in the storage board are colored with the same color as the article meant to be stored in them. In addition, their shape corresponds to that of said article. Square recess 39 is sized to receive cubical bottle 20, triangular recess 40 to receive pyramidal bottle 21, and circular recess 41 to receive spherical bottle 22. Recesses 42, 43, and 44 are circular in cross section and are sized to receive, respectively, the closures for bottles 20, 21, and 22. Recesses 45, 46, and 47 are shaped to receive the insertable objects associated, respectively, with bottles 20, 21, and 22. Recesses 45 are square in cross section, recesses 46 are triangular, and recesses 47 are round.

The component parts of the toy, as described, are attractive in themselves and will occupy a small child's attention. He can learn from the bottles how to manage three common types of bottle closures. As he becomes more familiar with the set he can learn to match parts by color and shape, and matching by one of these clues will automatically lead to matching by the other. For example, if cubical bottle 20 is green, and the child selects all green objects, he will also select those which, like bottle 20, are basically cubical in structure. A child who has noticed the concept or idea of "greenness" will thus be drawn to notice the common characteristics of shape associated with the green objects in the set and which might be called "squareness" or "cubicalness."

The following is claimed:
1. An instructional toy set comprising:
 (a) a plurality of bottles, each having a body with a mutually distinctive shape and color;
 (b) a plurality of sets of closure members, each set containing a plurality of closure members, and each set being associated with a bottle, said closure members having the same color as the bottle with which they are associated;
 (c) means for fastening the closure members to the mouths of the bottles with which they are associated, the means differing between the closure members in any one set; and
 (d) means for preventing the fastening of a closure means to a bottle with which it is not associated.
2. The toy set of claim 1 comprising:
 (e) a set of insertable objects associated with each bottle, each of said objects being of the same distinctive shape as the body of the bottle with which it is associated and each being sufficiently small to pass into and out of the bottle with which it is associated.
3. The toy set of claim 1 wherein each closure member bears a knob, said knob being of the same distinctive shape as the body of the bottle with which the closure member is associated.
4. The toy set of claim 2 wherein each closure member bears a knob, said knob being of the same distinctive shape as the body of the bottle with which the closure member is associated.
5. The toy set of claim 4 comprising a storage board, said storage board having surfaces defining recesses in its upper surface, each recess being shaped to receive a component of the toy set and the surfaces defining them being of the same color as the component intended to be received.
6. An educational toy comprising:
 (a) a cubical bottle having a body in the shape of a cube;
 (b) a pyramidal bottle differing in color from the cubical bottle and having a body in the shape of a triangular pyramid;
 (c) a spherical bottle differing in color from the cubical and pyramidal bottles and having a body in the shape of a sphere;
 (d) a bottleneck on each of said bottles, each said neck having a protruding lip on its upper outer edge and a set of screw threads below said lip, the diameter of said lip being less than the root diameter of said threads on any one bottleneck, and said diameters varying between different bottlenecks;
 (e) three snap-on lids, each sized to make a snap fit with the lip on one of the bottlenecks and having the same color as said bottleneck;
 (f) three screw-on lids, each having threads sized to make a screw-on fit with the threads on one of the bottlenecks and having the same color as said bottleneck;
 (g) three plugs, each sized to make a plug-in fit with the mouth of one of the bottlenecks and having the same color as said bottleneck;
 (h) a plurality of insertable objects associated with each bottle, each of said insertable objects having the same shape and color as the body of the bottle with which it is associated and each being sufficiently small to be movable into and out of said bottle;
 (i) a storage board for storing the above components, said storage board having surfaces defining individual storage recesses for each of said components, said surfaces being colored identically to the component to be stored therein, and said recesses conforming to the shape of the component to be stored therein.

References Cited

UNITED STATES PATENTS 2,623,303  12/1952  Mindel.
2,659,163  11/1953  Albee.

EUGENE R. CAPOZIO, Primary Examiner

W. H. GRIEB, Assistant Examiner

U.S. Cl. X.R.

273—156

PO-1050
(5/69)

UNITED STATES PATENT OFFICE
CERTIFICATE OF CORRECTION

Patent No. 3,496,652          Dated February 24, 1970

Inventor(s) Rhoda Ruth Wolfner and Myrtle S. Conte

It is certified that error appears in the above-identified patent and that said Letters Patent are hereby corrected as shown below:

Column 4, line 2, change "means" to -- member --.

SIGNED AND
SEALED
JUL 7 1970

(SEAL)
Attest:

Edward M. Fletcher, Jr.
Attesting Officer

WILLIAM E. SCHUYLER, JR.
Commissioner of Patents